United States Patent
Rappaport (10) Patent No.: US 9,769,360 B2
(45) Date of Patent: Sep. 19, 2017

(54) CAMERA RIG

(71) Applicant: HARRY POTTER INVESTMENTS LLC, Boston, MA (US)

(72) Inventor: Joshua Rappaport, Los Angeles, CA (US)

(73) Assignee: Harry Potter Investments LLC, Boston, MA (US)

( * ) Notice: Subject to any disclaimer, the term of this patent is extended or adjusted under 35 U.S.C. 154(b) by 0 days.

(21) Appl. No.: 14/665,963

(22) Filed: Mar. 23, 2015

(65) Prior Publication Data

US 2016/0286098 A1    Sep. 29, 2016

(51) Int. Cl.
*H04N 5/225* (2006.01)
*H04N 5/28* (2006.01)

(52) U.S. Cl.
CPC ......... *H04N 5/2251* (2013.01); *H04N 5/2252* (2013.01); *H04N 5/28* (2013.01)

(58) Field of Classification Search
CPC .................................................. H04N 5/2251
See application file for complete search history.

(56) References Cited

U.S. PATENT DOCUMENTS

| | | | |
|---|---|---|---|
| 3,688,676 A * | 9/1972 | Cruickshank | G03B 15/00 355/47 |
| 4,017,168 A | 4/1977 | Brown | |
| 4,158,489 A | 6/1979 | Gottschalk et al. | |
| 4,158,490 A | 6/1979 | Gottschalk et al. | |
| 4,216,602 A * | 8/1980 | Daniels | A01K 87/00 43/18.1 R |
| 4,699,484 A * | 10/1987 | Howell | F16M 11/10 352/132 |
| 4,991,758 A * | 2/1991 | Eaneff | F16M 13/04 224/200 |
| 5,294,947 A | 3/1994 | Harrington | |
| 5,454,042 A * | 9/1995 | Drever | F16M 13/04 381/361 |

(Continued)

FOREIGN PATENT DOCUMENTS

| | | |
|---|---|---|
| JP | H 10-122481 A | 5/1998 |
| JP | 2000-241853 A | 9/2000 |

(Continued)

OTHER PUBLICATIONS

NewEgg, Steadicam Flycam 5000 Camera Stabilizer w/ Vest, http://www.newegg.com/Product/Product.aspx?Item=9S1A1650PF2920, 2 pages, Jul. 3, 2014.

(Continued)

*Primary Examiner* — Gary C Vieaux
(74) *Attorney, Agent, or Firm* — Lewis Roca Rothgerber Christie LLP (57) ABSTRACT

A camera rig configured support a video camera or other cinematographic equipment is disclosed. The camera rig includes a first track and a second track movably coupled to the first track. The second track is configured to move along the first track between a first angular position and a second angular position. The camera rig also includes a platform movably coupled to the second track. The platform is configured to support the video camera or the other cinematographic equipment. The platform is configured to move along the second track between a first vertical position and a second vertical position.

8 Claims, 6 Drawing Sheets

(56) References Cited

U.S. PATENT DOCUMENTS

| | | | |
|---|---|---|---|
| 5,462,214 A | 10/1995 | Buswell | |
| 5,473,368 A * | 12/1995 | Hart | G08B 13/1963 |
| | | | 348/155 |
| 5,579,071 A | 11/1996 | Wetzel et al. | |
| 5,598,963 A | 2/1997 | Buswell | |
| 5,649,257 A | 7/1997 | Kempka | |
| 5,920,735 A * | 7/1999 | Gelphman | G03B 37/02 |
| | | | 348/E5.042 |
| 6,188,849 B1 | 2/2001 | Staicouras | |
| 6,320,641 B1 * | 11/2001 | Bauer | G01N 21/8806 |
| | | | 348/E5.029 |
| 6,764,231 B1 | 7/2004 | Shubert | |
| 6,916,124 B1 | 7/2005 | Correira | |
| 7,068,927 B2 | 6/2006 | Itzkowitz | |
| 7,097,368 B2 | 8/2006 | Gonzales | |
| 7,318,678 B2 | 1/2008 | DeSorbo et al. | |
| 7,520,684 B2 * | 4/2009 | Ingalls | G08B 13/19623 |
| | | | 348/373 |
| 7,588,376 B2 * | 9/2009 | Friedrich | F16M 11/02 |
| | | | 248/183.2 |
| 7,931,412 B2 | 4/2011 | Brown | |
| 8,021,059 B2 * | 9/2011 | Coppola | F16M 11/045 |
| | | | 396/428 |
| 8,079,501 B2 * | 12/2011 | Woodman | A45C 11/38 |
| | | | 224/222 |
| 8,567,952 B2 | 10/2013 | Taylor | |
| 8,657,507 B2 | 2/2014 | Di Leo | |
| 8,757,900 B2 * | 6/2014 | Chapman | F16M 11/10 |
| | | | 396/421 |
| 8,967,889 B2 * | 3/2015 | Kessler | G03B 17/561 |
| | | | 396/428 |
| 9,125,676 B2 * | 9/2015 | Sahni | A61B 19/201 |
| 9,140,339 B1 * | 9/2015 | Dickinson | F16H 7/18 |
| 2005/0094994 A1 * | 5/2005 | Paolantonio | G03B 17/55 |
| | | | 396/427 |
| 2005/0101348 A1 * | 5/2005 | Wang | G02B 13/001 |
| | | | 455/556.1 |
| 2009/0255763 A1 * | 10/2009 | Nieboer | H01Q 1/125 |
| | | | 187/277 |
| 2010/0254696 A1 | 10/2010 | McKay | |

FOREIGN PATENT DOCUMENTS

| | | |
|---|---|---|
| JP | 4190363 B2 | 12/2008 |
| KR | 10-2013-0128051 A | 11/2013 |
| WO | WO 2010/058179 A1 | 5/2010 |

OTHER PUBLICATIONS

Kaiser phototechnik, Copylizer eVision exe.cutive, http://www.kaiser-fototechnik.com/en/produkte/2_1_produktanzeige.asp?nr=5211, 2 pages, Jul. 3, 2014.

Walter Klassen FX, Far out body mount, http://shop.walterklassen.com/, 5 pages, Jul. 7, 2014.

College of Design Advanced Media Lab, Glidecam V8, http://onebitpixel.com/aml/?page_id=260, 6 pages, Jul. 7, 2014.

International Search Report and Written Opinion for International Application No. PCT/US2016/023793, mailed Jul. 29, 2016, 12 pages.

* cited by examiner

CAMERA RIG

FIELD

The present disclosure relates generally to rigs for supporting camera equipment and, more particularly, to a camera rig having angular and vertical adjustability.

BACKGROUND

A variety of different cinematographic technologies exist to provide varying levels of immersion into a cinematic scene. For instance, a 360-degree camera may be mounted to a subject and then a scene may be recorded as the subject moves through an environment (e.g., a 360-camera may be mounted to a skier to record the environment around the skier as the skier skis down a hill). The scene recorded with a 360-degree camera enables a viewer (e.g., a viewer wearing a virtual reality headset) to rotate the view around the center of the camera (i.e., the center of the subject to whom the 360-degree camera is mounted). However, a scene recorded with a 360-degree camera alone does not permit a user to look in towards the subject. Accordingly, a scene filmed with a 360-degree camera both limits the degree of immersion into the scene and also limits the type of scenes which may be filmed (e.g., due to the outward-looking perspective of 360-degree cameras, these cameras are generally not suitable to film interplay between two or more characters).

Additionally, traditional Lumiere-style cameras may be used to film a static scene at multiple vantage points (e.g., front, back, left, and right). These four views may then be combined (e.g., by digital processing techniques) to form a scene in which a user can rotate the view around the subjects by switching between the four perspectives. However, this technique does not permit the user to see outward away from the subjects of the scene. Additionally, conventional camera rigs and techniques are not suitable for filming a dynamic scene (e.g., a scene in which the subjects are moving) from multiple vantage points, because such conventional camera rigs are not able to ensure the necessary uniform and identical movement of the camera from each of the different vantage points, which is necessary to ensure continuity between the various perspectives.

SUMMARY

The present disclosure is directed to various embodiments of a camera rig. In one embodiment, the camera rig includes a first track, a second track movably coupled to the first track, and a platform movably coupled to the second track. The second track is configured to move along the first track between a first angular position and a second angular position. The platform is configured to support a camera. The platform is configured to move along the second track between a first vertical position and a second vertical position. The camera rig may also include a first crank coupling the second track to the first track. The first crank is configured to move the second track along the first track between the first angular position and the second angular position. The camera rig may also include a second crank coupling the platform to the second track. The second crank is configured to move the platform along the second track between the first vertical position and the second vertical position. The first track may be semi-annular and may include radial indicia. The radial indicia may include a pair of complementary or supplementary angles. The camera rig may also include a support base coupled to the first track. The camera rig may further include a harness coupled to the support base. The camera rig may also include a pair of first stops positionable along the first track to aid in setting an angular position of the second track along the first track and a pair of second stops positionable along the second track to aid in setting a vertical position of the platform along the second track. The first and second tracks may each include a series of teeth. The camera rig may also include a dolly coupled to the first track. The camera rig may also include a rangefinder coupled to the platform. The camera rig may further include a pedometer coupled to the support base.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of a camera rig. The camera rigs of the present disclosure enable an operator to film both an inward-looking and an outward-looking perspective of a static or dynamic scene. The camera rigs of the present disclosure are also configured to enable the operator to repeatedly and consistently perform the same relative motion of a video camera supported on the camera rig when filming a scene from the same vantage point and different vantage points.

Figure 3:
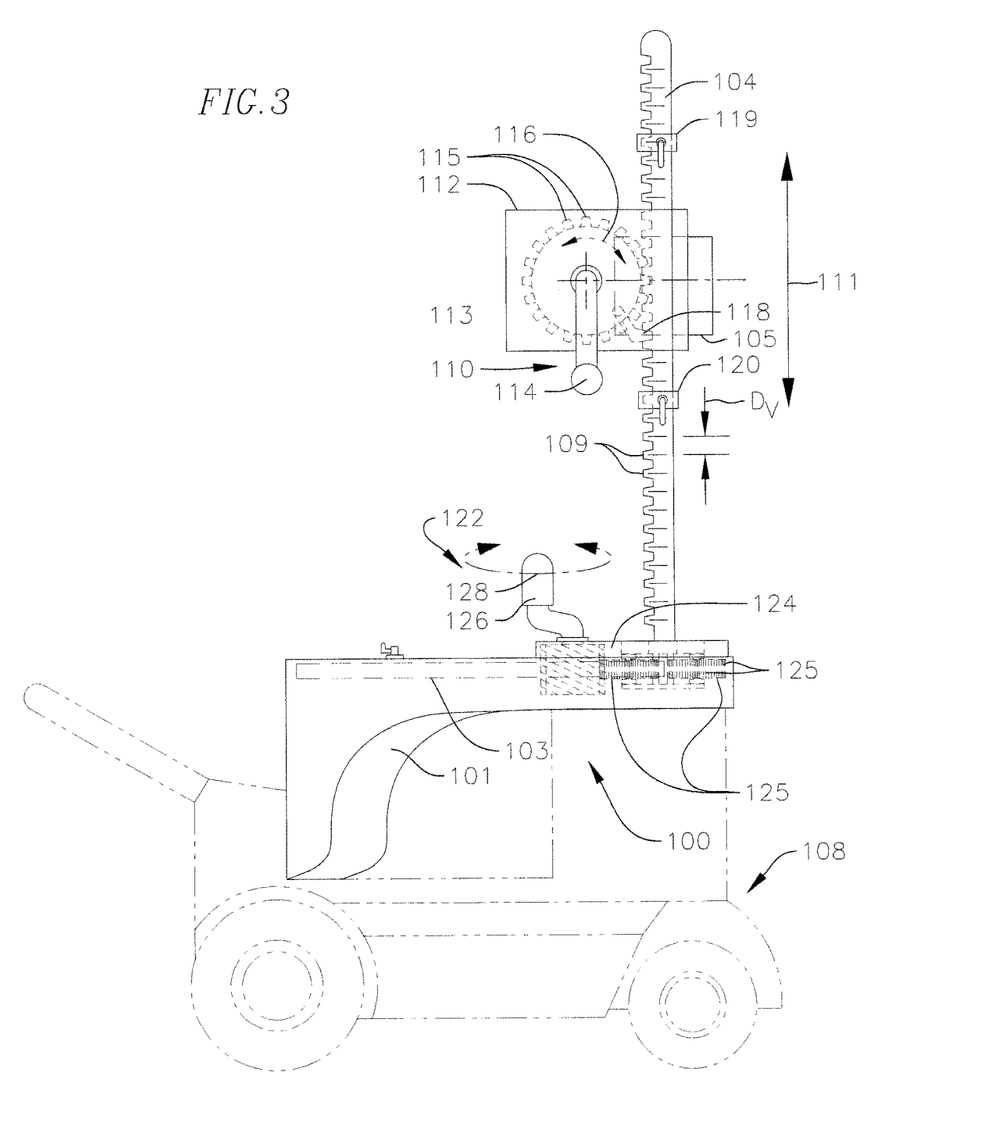
FIG. 3 is a perspective view of a camera rig according to another embodiment of the present disclosure.

With reference now to FIGS. 1A-1D, a camera rig assembly 100 according to one embodiment of the present disclosure includes a base 101, a harness assembly 102 coupled to the base 101, a horizontal track 103 coupled to the base 101, a vertical track 104 coupled to the horizontal track 103, and a platform 105 movably coupled to the vertical track 104. The platform 105 is configured to support a video camera and/or other videography equipment. The harness assembly 102 is configured to secure the camera rig assembly 100 to an operator. When the harness assembly 102 is secured to an operator, at least a portion of the base 101 presses against the operator (e.g., against operator's abdomen and/or chest). In the illustrated embodiment, the harness assembly 102 includes a waist strap 106 (e.g., a belt) and a pair of shoulder straps 107, although in one or more embodiments, the camera rig assembly 100 may include any other suitable mechanism for securing the camera rig to an operator. Additionally, in one or more alternate embodiments, the camera rig assembly 100 may be provided without the harness assembly 102 and the camera rig assembly 100 may include a wheeled dolly 108 (see FIG. 3). In another embodiment, the camera rig assembly 100 may include both the harness assembly 102 and the wheeled dolly 108 to permit the camera rig assembly 100 to be either worn by the operator or wheeled around by the operator.

With continued reference to the embodiment illustrated in FIGS. 1A-1D, the vertical track 104 includes a plurality of teeth 109 (e.g., the vertical track 104 is geared). In the illustrated embodiment, the teeth 109 are on an inner side of the vertical track 104, although in one or more embodiments, the teeth 109 may be provided on any other suitable portion of the vertical track 104. Adjacent teeth 109 may be spaced apart by any suitable distance $D_V$, depending, for instance, on the desired incremental adjustability of the vertical position of the platform 105 and the video camera or other equipment supported thereon (i.e., the pitch of the teeth 109 on the vertical track 104 may be selected based on the desired adjustability of the vertical position of the platform 105). For instance, in one or more embodiments, the pitch $D_V$ of the teeth 109 on the vertical track 104 may be from approximately 0.1 inch to approximately 0.5 inch such that the vertical position of the platform 105 along the vertical track 104 can be adjusted in increments from approximately 0.1 inch to approximately 0.5 inch. Although in the illustrated embodiment the vertical track 104 is straight or substantially straight, in one or more alternate embodiments, at least a portion of the vertical track 104 may be curved depending on the desired path of the platform 105 and the video camera or other equipment supported on the platform 105.

Still referring to the embodiment illustrated in FIGS. 1A-1D, the camera rig assembly 100 includes a vertical crank assembly 110 coupled to the vertical track 104. The vertical crank assembly 110 is configured to move (arrow 111) the platform 105 along the vertical track 104 to set the vertical position of the platform 105 and the video camera 117 and/or other equipment supported thereon. In the illustrated embodiment, the vertical crank assembly 110 includes a carrier 112, a pinion gear 113 housed in the carrier 112, and a vertical adjustment crank 114 coupled to the pinion gear 113. In the illustrated embodiment, the platform 105 is coupled to the carrier 112 of the vertical crank assembly 110. The pinion gear 113 includes a plurality of teeth 115 that are configured to engage the teeth 109 on the vertical track 104. Rotation (arrow 116) of the vertical adjustment crank 114 is configured to move (arrow 111) the vertical crank assembly 110 up and down along the vertical track 104 to adjust the vertical position of platform 105 and the video camera 117 and/or other equipment supported on the platform 105. In one or more embodiments, the carrier 112 may house a plurality of gears depending, for instance, on the desired gear ratio of the vertical crank assembly 110 (e.g., the extent to which the vertical adjustment crank 114 must be rotated (arrow 116) to cause the platform 105 to move up one tooth 109 on the vertical track 104). In one embodiment, the size of the pinion gear 113 and/or the gear ratio of the other gears in the carrier 112 may be selected such that an approximately 10 degree rotation (arrow 116) of the vertical adjustment crank 114 causes the crank assembly 110 and the platform 105 to move up one tooth 109 along the vertical track 104 (i.e., one complete rotation (arrow 116) of the vertical adjustment crank 114 changes the vertical position of the platform 105 by an amount corresponding to the total combined pitch of thirty-six teeth 109). In the illustrated embodiment, the vertical crank assembly 110 and the vertical track 104 together function as a rack-and-pinion system. In one or more alternate embodiments, the camera rig assembly 100 may include any other suitable type or kind of actuator configured to adjust the vertical position of the platform 105 and the video camera 117 and/or other equipment supported thereon, such as, for instance, a stepper motor, a motor driving a chain or belt around one or more pulleys, and/or one or more hydraulic or pneumatic actuators. Additionally, the mechanism for adjusting the vertical position of the platform 105 may be either manual or automated. Further, the vertical adjustment crank 114 may be either directly coupled to the pinion gear 113 or indirectly coupled to the pinion gear 113 by any suitable type of gear, such as, for instance, a spur gear, a worm gear, a bevel gear, or a helical gear.

Additionally, in the illustrated embodiment, the vertical crank assembly 110 includes a ratchet mechanism 118 configured to engage the teeth 109 on the vertical track 104 such that the platform 105 remains in the selected vertical position when the user stops rotating (arrow 116) the vertical adjustment crank 114. In one embodiment, the ratchet mechanism 118 may be selectively disengaged to permit the vertical crank assembly 110 and the platform 105 coupled thereto to be slid down (arrow 111) along the vertical track 104.

With continued reference to the embodiment illustrated in FIGS. 1A-1D, a lower end of the vertical track 104 is movably coupled to the horizontal track 103. In one or more embodiments, the vertical track 104 may be coupled to the horizontal track 103 at any other suitable position along the length of the vertical track 104 (e.g., the vertical track 104 may be coupled to the horizontal track 103 at or proximate a center point of the vertical track 104). Additionally, in one or more embodiments, the vertical track 104 may move vertically relative to the horizontal track 103. For instance, in one or more embodiments, the platform 105 may be fixedly coupled to the vertical track 104 and the vertical crank assembly 110 may be configured to move the vertical track 104 up and down relative to the horizontal track 103 (e.g., rotating the vertical adjustment crank 114 may cause the vertical track 104 and the platform 105 to move vertically up or down relative to the horizontal track 103).

In the embodiment illustrated in FIGS. 1A-1D, the platform 105 is a planar member, although in one or more embodiments, the platform 105 may have any other suitable configuration depending, for instance, on the type or kind of camera 117 or other cinematic equipment the platform 105 is designed to support. Additionally, in one or more embodiments, the camera rig assembly 100 may include one or more mechanisms for adjusting the angular orientation of the platform 105 and the camera 117 or other cinematic equipment supported on the platform 105, such as, for instance, a 3-axis gimbal. In one or more embodiments, the platform 105 may also include one or more retraining mechanisms for securing the video camera 117 and/or other cinematic equipment to the platform 105, such as, for instance, one or more straps, brackets, and/or clamps.

With continued reference to the embodiment illustrated in FIGS. 1A-1D, the camera rig assembly 100 also includes at least one stop or marker positionable (e.g., slidable) along the vertical track 104. During filming of a scene with a video camera 117 supported on the platform 105, the one or more stops are configured to indicate to an operator the desired starting and/or ending vertical position of the platform 105 and the video camera 117 supported thereon. In the illustrated embodiment, the camera rig assembly 100 includes an upper stop 119 above the vertical crank assembly 110 and a lower stop 120 below the vertical crank assembly 110 (i.e., the vertical crank assembly 110 is disposed between the upper and lower stops 119, 120). In one embodiment, one of the stops 119, 120 may be positioned along the vertical track 104 corresponding to a desired starting vertical position and the other stop 119, 120 may be positioned along the vertical track 104 corresponding to a desired ending vertical position. Accordingly, the operator may initially align the vertical crank assembly 110 and the platform 105 coupled thereto with the stop 119, 120 indicating the starting vertical position. The operator may then begin filming the scene and crank the vertical adjustment crank 114 until the platform 105 reaches the stop 119, 120 indicating the ending vertical position. Although in one or more embodiments the stops 119, 120 may physically impede movement of the platform 105 past the stops 119, 120 (e.g., the stops 129, 130 may be locked to the vertical track 104 by a set screw, a quick-release mechanism, or any other suitable locking mechanism), in one or more embodiments, the stops 119, 120 may provide a visual cue to the operator to stop cranking the vertical adjustment crank 114, but the stops 119, 120 may not prevent movement of the platform 105 past the stops 119, 120. In one embodiment, the operator may utilize a timing device (e.g., a metronome) to determine the rate with which to rotate (arrow 116) the vertical adjustment crank 114 during the filming of the scene. Accordingly, the stops 119, 120 enable the camera rig operator to repeatedly achieve the same vertical movement of the video camera when repeatedly filming a scene and/or filming a scene from different vantage points. In one or more embodiments, the vertical track 104 may also include visual indicia of the vertical position along the vertical track 104. In one or more embodiments, the visual indicia on the vertical track 104 may include tick marks corresponding to the pitch of the teeth 109 on the vertical track 104. The visual indicia may also include height measurements indicating, for instance, the distance along the length of the vertical track 104 and/or the vertical position along the vertical track 104 relative to the horizontal track 103.

With continued reference to the embodiment illustrated in FIGS. 1A-1D, the horizontal track 103 is curved (e.g., arcuate). In the illustrated embodiment, the horizontal track 103 is semi-annular and extends approximately 180 degrees around a longitudinal axis L. In one or more embodiments, the horizontal track 103 may extend to any other suitable angular extent, such as, for instance, less than 180 degrees (e.g., approximately 90 degrees) or greater than 180 degrees. Accordingly, in the illustrated embodiment, when the camera rig assembly 100 secured to an operator by the harness assembly 102, the horizontal track 103 extends at least partially around the operator. In one or more embodiments, the horizontal track 103 may have any other suitable shape depending on the desired path of the platform 105 and the video camera or other equipment supported on the platform 105 (e.g., in one or more embodiments, at least a portion of the horizontal track 103 may be straight or substantially straight).

With continued reference to the embodiment illustrated in FIGS. 1A-1D, inner and outer sides of the horizontal track 103 include a plurality of teeth 121 (e.g., the horizontal track 103 is geared). Adjacent teeth 121 may be spaced apart by any suitable distance $D_H$, depending, for instance, on the desired incremental adjustability of the angular orientation and horizontal position of the vertical track 104, the platform 105, and the video camera 117 or other equipment supported on the platform 105 (i.e., the pitch of the teeth 121 on the horizontal track 103 may be selected based on the desired adjustability of the angular orientation and horizontal position of the video camera 117 on the platform 105). For instance, in one or more embodiments, the pitch $D_H$ of the teeth 121 on the horizontal track 103 may be selected such that the angular orientation of the video camera supported on the platform 105 can be adjusted in increments from approximately 0.1° to approximately 5° (e.g., approximately 1°). In one or more embodiments, the horizontal track 103 or a segment thereof may be replaced by a horizontal track or a segment thereof having a different configuration than the replaced horizontal track or segment thereof. For instance, in one or more embodiments, the horizontal track 103 may be replaced by a track segment having a different pitch between the teeth 121 and/or a different curvature.

Still referring to the embodiment illustrated in FIGS. 1A-1D, the camera rig assembly 100 includes a horizontal crank assembly 122 coupled to the horizontal track 103 and the lower end of the vertical track 104. The horizontal crank assembly 122 is configured to move (arrow 123) the vertical track 104, the vertical crank assembly 110, and the platform 105 along the horizontal track 104 to set the angular orientation and horizontal position of the video camera 117 and/or other equipment supported on the platform 105. In the illustrated embodiment, the horizontal crank assembly 122 includes a carrier 124, a pair of pinion gears 125 housed in the carrier 124, and a horizontal adjustment crank 126 coupled to the pinion gears 125. Although in the illustrated embodiment, the pinion gears 125 are on opposite sides of the horizontal track 104 (e.g., the horizontal track 104 is disposed between the pair of pinion gears 125), in one or more embodiments, the pinion gears 125 may have any other suitable arrangement relative to the horizontal track 104. In the illustrated embodiment, the vertical track 104 is coupled to the carrier 124 of the horizontal crank assembly 122. The pinion gears 125 each include a plurality of teeth 127 that are configured to engage the teeth 121 on the horizontal track 103. Rotation (arrow 128) of the horizontal adjustment crank 126 is configured to move (arrow 123) the horizontal crank assembly 122 along the horizontal track 103 to adjust the horizontal position and angular orientation of the vertical track 104, vertical crank assembly 110, the platform 105, and the video camera 117 and/or other equipment supported on the platform 105. In one or more embodiments, the carrier 124 may house a plurality of gears depending, for instance, on the desired gear ratio of the horizontal crank assembly 122 (e.g., the extent to which the horizontal adjustment crank 126 must be rotated (arrow 128) to cause the horizontal crank assembly 122 and the vertical track 105 to move one tooth 121 along the horizontal track 103). Additionally, the horizontal adjustment crank 126 may be either directly coupled to one or both of the pinion gears 125 or indirectly coupled to one or both of the pinion gears 125 by any suitable type of gear, such as, for instance, a spur gear, a worm gear, a bevel gear, or a helical gear. Further, in one or more embodiments, one of the pinion gears 125 may be replaced by a roller. In one or more alternate embodiments, the camera rig assembly 100 may have any other suitable type of mechanism to adjust the angular orientation and horizontal position of the video camera 117 and/or other equipment supported on the platform 105, such as, for instance, rails, bearings, and/or wheels.

In one embodiment, the size of the pinion gear 125 and/or the gear ratio of the other gears in the carrier 124 may be selected such that an approximately 10 degree rotation (arrow 128) of the horizontal adjustment crank 126 causes the horizontal crank assembly 122 and the platform 105 to move (arrow 123) one tooth 121 along the horizontal track 103. In one or more embodiments, rotation (arrow 128) of the horizontal adjustment crank 126 by approximately 10 degrees causes the vertical track 104 to move (arrow 123) along the horizontal track 103 such that the orientation of the vertical track 104, the platform 105, and the video camera 117 and/or other equipment supported on the platform 105 is adjusted by approximately 1 degree (e.g., one complete, 360 degree rotation (arrow 128) of the horizontal adjustment crank 126 changes the angular orientation by 36 degrees). In the illustrated embodiment, the horizontal crank assembly 122 and the horizontal track 103 together function as a rack-and-pinion system. In one or more alternate embodiments, the camera rig assembly 100 may include any other suitable type or kind of actuator configured to adjust the horizontal position and orientation of the vertical track 104, the platform 105, and the video camera 117 and/or other equipment supported on the platform 105, such as, for instance, a stepper motor, a motor driving a chain or belt around one or more pulleys, and/or one or more hydraulic or pneumatic actuators. Additionally, the mechanism for adjusting the horizontal position and orientation of the vertical track 104 and the platform 105 may be either manual or automated.

With continued reference to the embodiment illustrated in FIGS. 1A-1D, the camera rig assembly 100 also includes a pair of stops or markers 129, 130 that are positionable (e.g., slidable) along the horizontal track 103. During filming of a scene with the video camera 117 supported on the platform 105, the stops 129, 130 are configured to indicate to an operator the desired starting and ending horizontal positions and angular orientations of the platform 105 and the video camera 117 supported thereon. In the illustrated embodiment, one of the stops 129 may be positioned along the horizontal track 103 corresponding to a starting angular/horizontal position and the other stop 130 may be positioned along the horizontal track 103 corresponding to an ending angular/horizontal position. Accordingly, the operator may initially align the horizontal crank assembly 122, the vertical track 104, and the platform 105 coupled to the vertical track 104 with the stop 129 indicating the starting angular/horizontal position. The operator may then begin filming the scene and crank (arrow 128) the horizontal adjustment crank 126 until the horizontal crank assembly 122 and vertical track 104 reached the stop 130 indicating the ending angular/horizontal position. In one embodiment, the operator may utilize a timing device (e.g., a metronome) to determine the rate with which to rotate (arrow 128) the horizontal adjustment crank 126 during the filming of the scene. Accordingly, the stops 129, 130 enable the camera rig operator to repeatedly achieve the same angular movement of the video camera when repeatedly filming a scene from the same vantage point. As described below in more detail, the stops 129, 130 also enable the operator to achieve the same relative angular movement of the video camera when filming a scene from different vantage points. Although in one or more embodiments the stops 129, 130 may physically impede movement of the vertical track 104 past the stops 129, 130 (e.g., the stops 129, 130 may be locked to the horizontal track 103 by a set screw, a quick-release mechanism, or any other suitable locking mechanism), in one or more embodiments, the stops 129, 130 may provide a visual cue to the operator to stop cranking the horizontal adjustment crank 126, but the stops 129, 130 may not prevent movement of the horizontal crank assembly 122 and the vertical track 104 past the stops 129, 130.

Additionally, in the illustrated embodiment, an upper surface of the horizontal track 103 includes visual indicia 131 of a series of angular positions along the horizontal track 103. In one or more embodiments, the visual indicia 131 on the horizontal track 103 may include tick marks corresponding to the pitch of the teeth 121 on the horizontal track 103. Additionally, in the illustrated embodiment, each indicator position of the visual indicia 131 includes a pair of angles the sum of which is the angular extent of the horizontal track 103. In the illustrated embodiment, the horizontal track 103 includes an upper row of angular indicia that increase in a regular interval in a clockwise manner and a lower row of angular indicia that increase in the same regular interval in a counterclockwise manner. For instance, in an embodiment in which the horizontal track 103 extends 180 degrees around the longitudinal axis L, each indicator position includes a pair of supplementary angles (e.g., 10°/170°, 45°/135°, and 90°/90°). In an embodiment in which the horizontal track 103 extends 90 degrees, each indicator position includes a pair of complementary angles (e.g., 10°/80°, 20°/70°, and 45°/45°). In one or more embodiments, the visual indicia 131 may include angular indicia listed in one degree increments. In one or more alternate embodiments, the visual indicia 131 may be listed with any other suitable angular increment, such as, for instance, greater than one degree (e.g., angular pairs listed in five degree increments) or less than one degree (e.g., angular pairs listed with one-half degree increments). In one or more embodiments, the corresponding angular indicia may be provided on the base 101 rather than the horizontal track 103. Collectively, the corresponding angular indicia are referred to herein as an "inverse angular map."

Figure 1A:
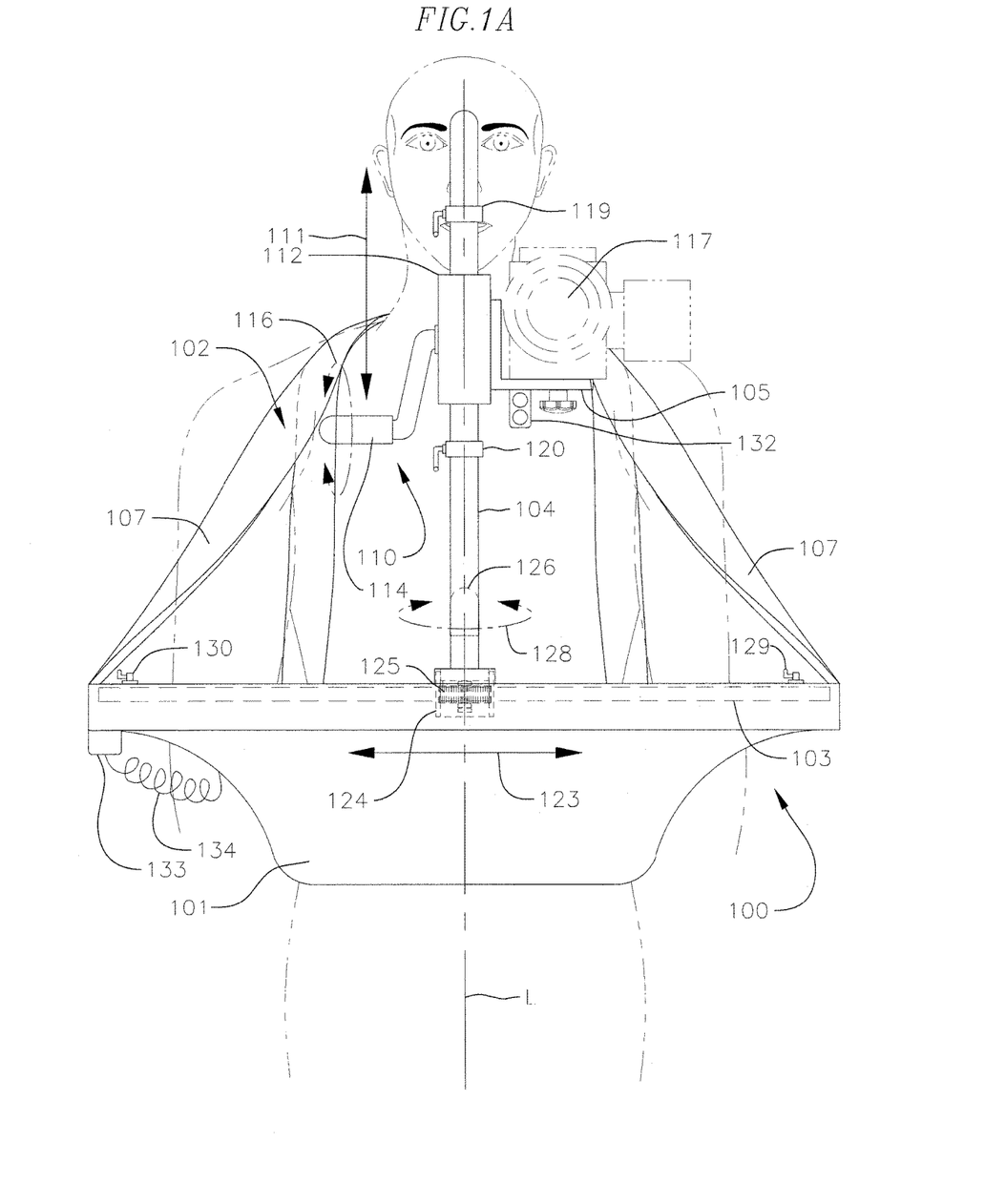
FIGS. 1A-1D are a front view, a side view, and two top down views, respectively, of a camera rig according to one embodiment of the present disclosure supporting a video camera.
Figure 1B:
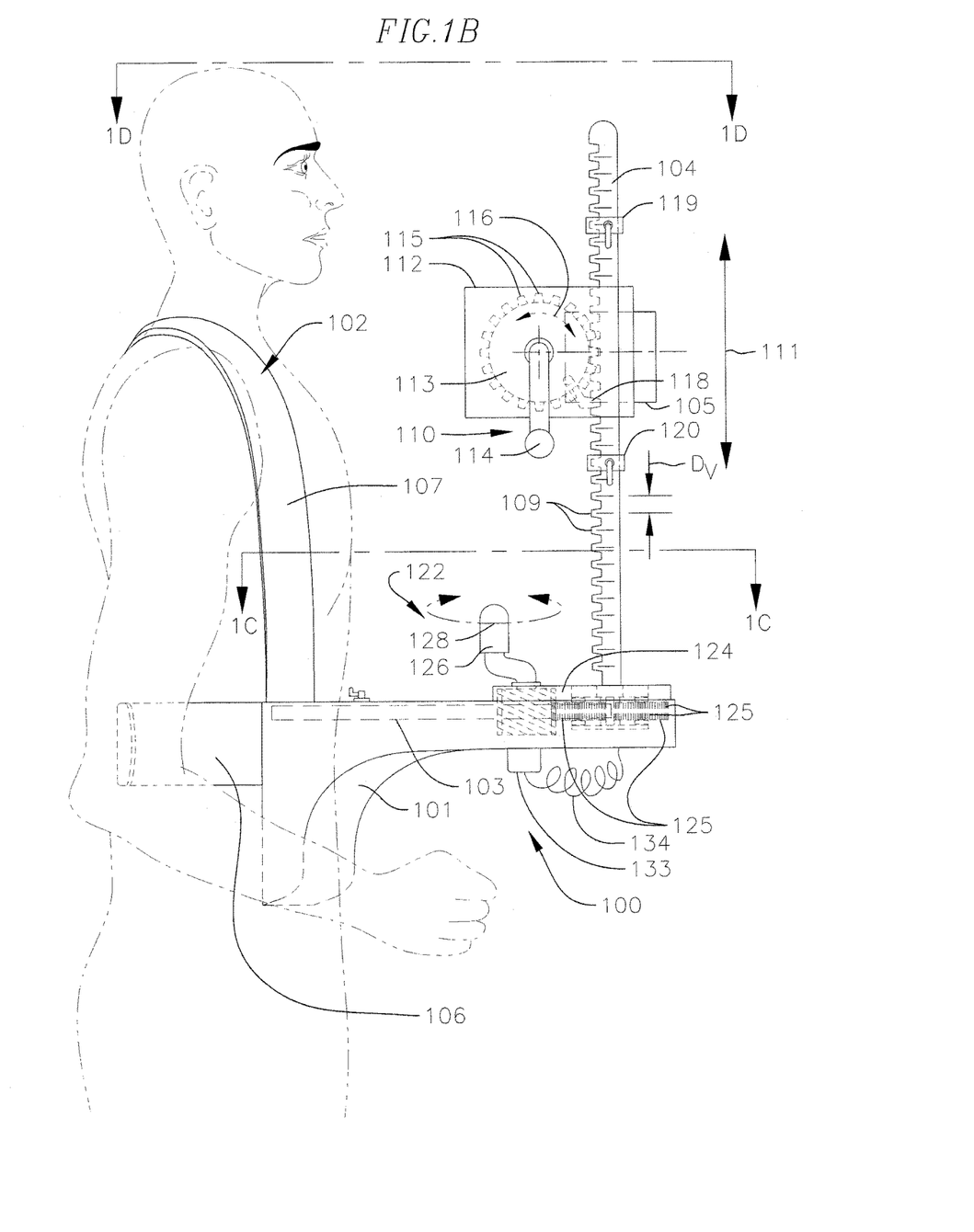
Figure 1C:
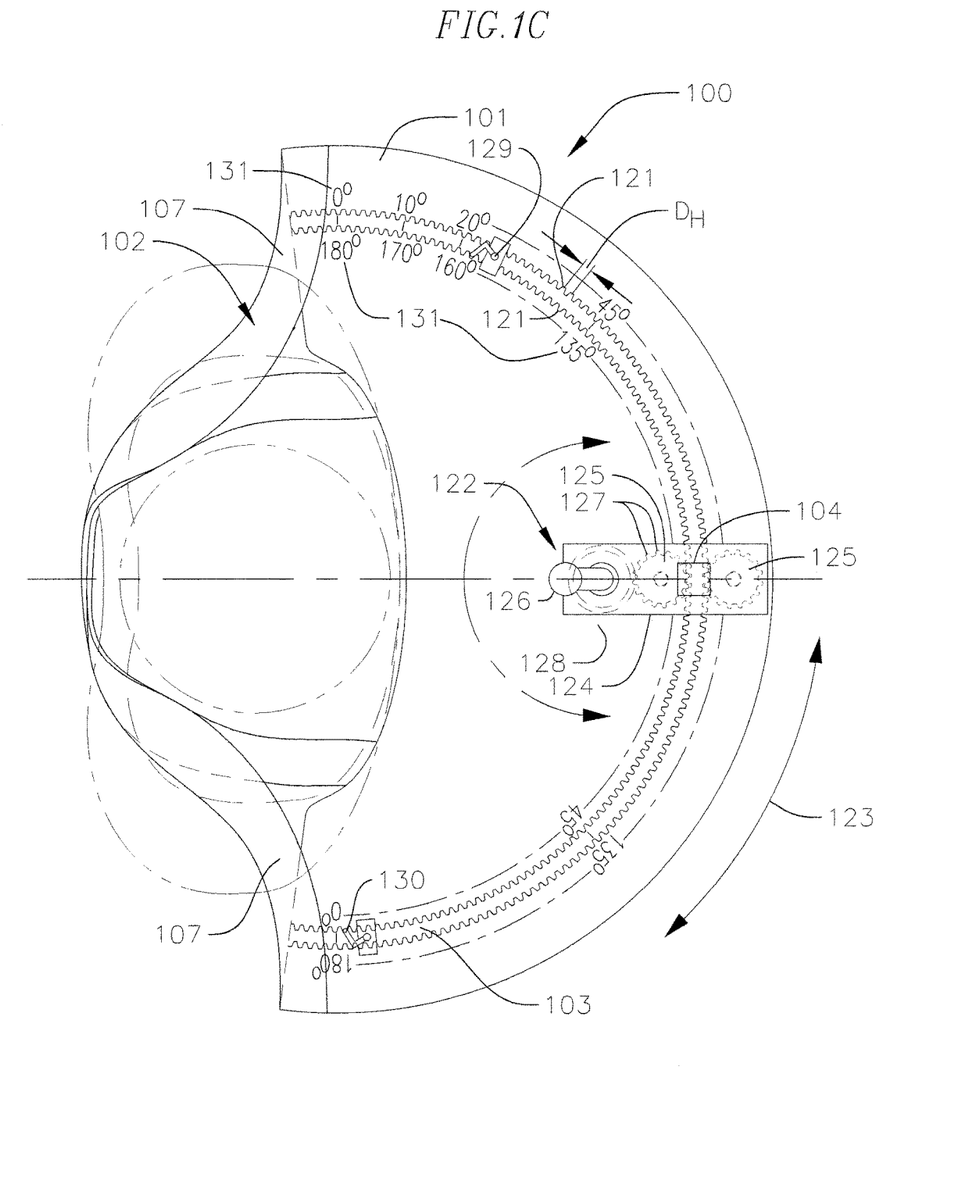
Figure 1D:
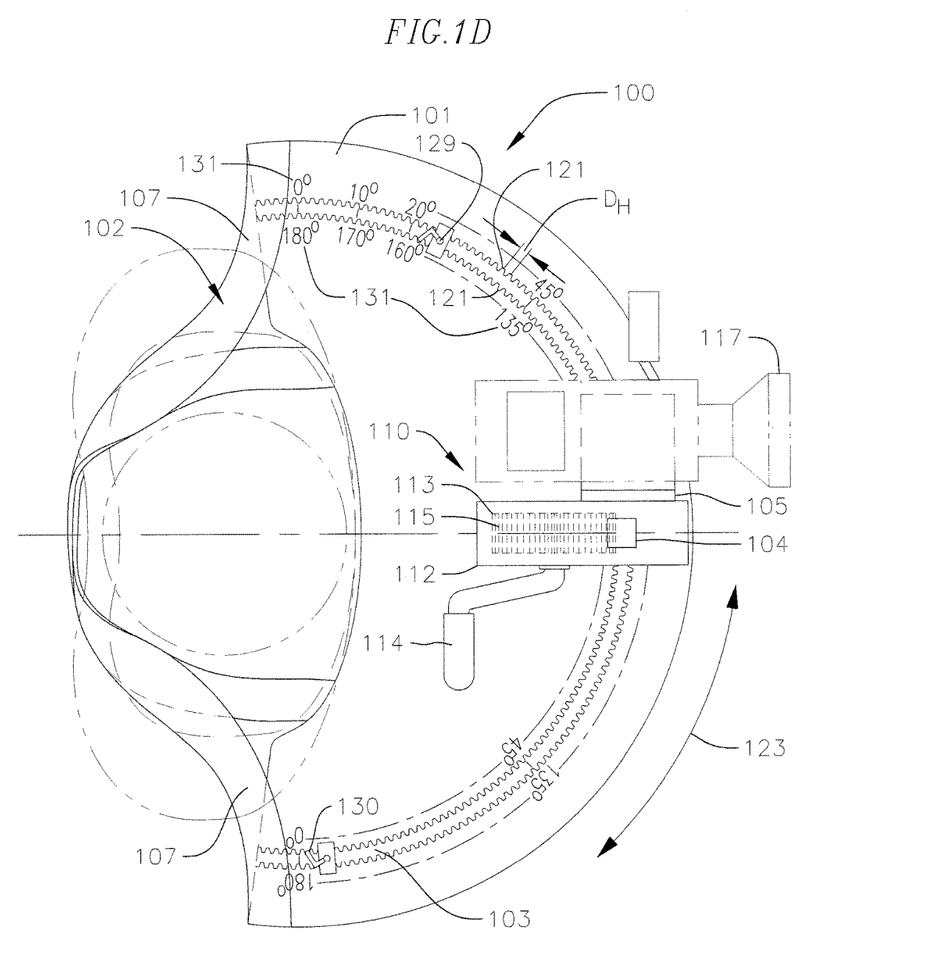
Figure 2:
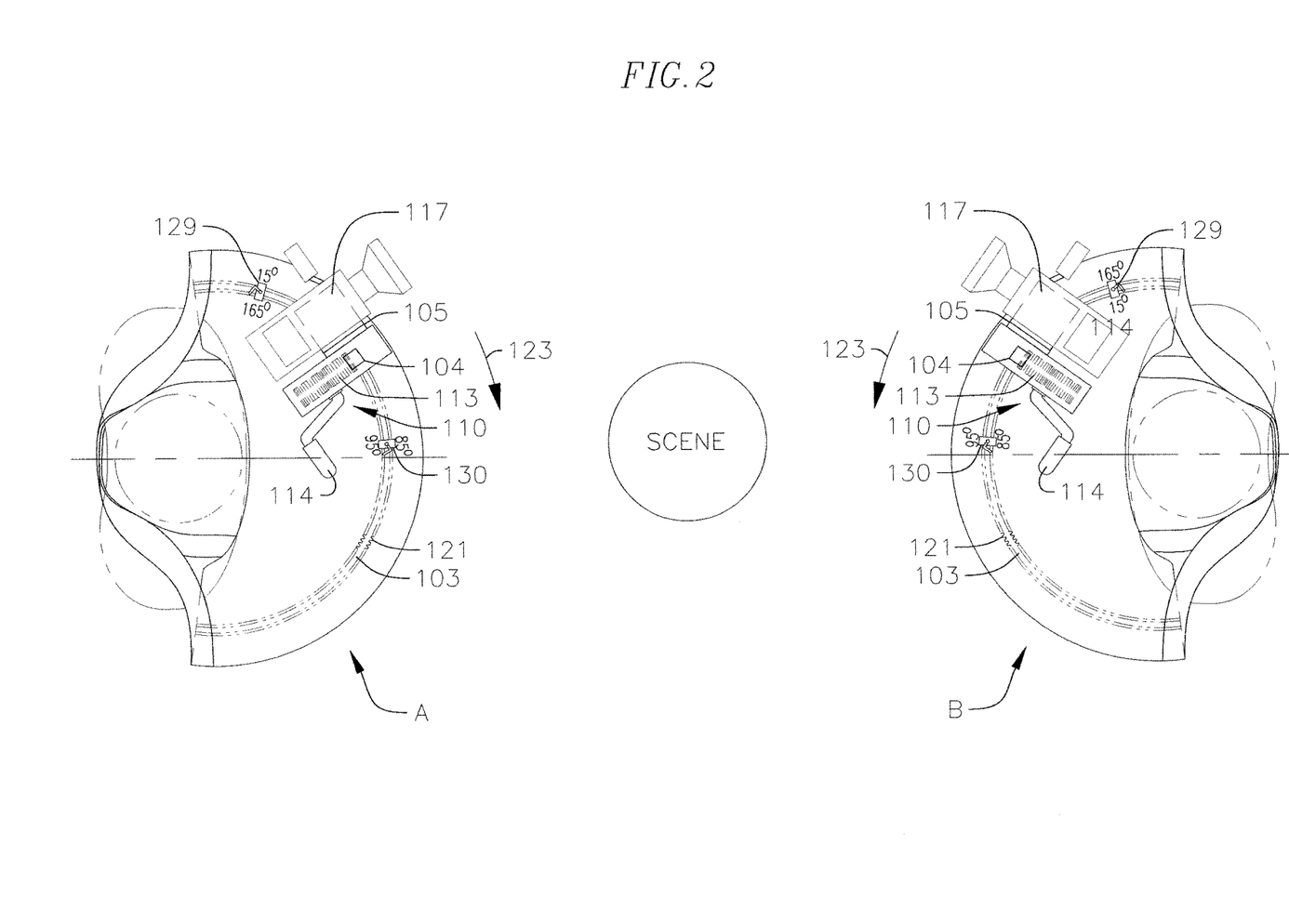
FIG. 2 is a top view of the camera rig illustrated in FIGS. 1A-1C filming a scene from a first vantage point and a second vantage point.

Providing corresponding angular indicia at each indicator position allows an operator to perform the same relative angular motion of the video camera 117 from different vantage points (e.g., from mirrored or opposing vantage points). For example, as illustrated in FIG. 2, when the camera operator is preparing to film a scene from a first vantage point (A), the operator may first set the stops 129, 130 along the horizontal track 103 at 15 degrees and 85 degrees, respectively, as indicated by the angular indicia in the upper row of angular indicia. The operator may then film the scene from the first vantage point while cranking the horizontal adjustment crank 126 to cause the horizontal crank assembly 122, the vertical track 104, the platform 105, and the video camera 117 supported on the platform 105 to move from the 15 degree angular position to the 85 degree angular position, as indicated in the upper row of indicia. When the camera operator is then preparing to film the same scene from a second vantage point (B in FIG. 2) opposite the first vantage point (A) (i.e., a mirrored vantage point), the operator may refer to the corresponding angles in the lower row of indicia to determine where to reset the stops 129, 130. For instance, in an embodiment in which the horizontal track 103 extends approximately 180 degrees around the longitudinal axis L, the angular indicia in the lower row that correspond to 15 degrees and 85 degrees in the upper row are 165 degrees and 95 degrees, respectively. Accordingly, the operator may then reset the stops 129, 130 along the horizontal track 103 to 165 degrees and 95 degrees, respectively, as indicated by the angular indicia in the upper row of angular indicia, and then film the scene from the second vantage point (B) while cranking the horizontal adjustment crank 126 to cause the horizontal crank assembly 122, the vertical track 104, the platform 105, and the video camera 117 supported on the platform 105 to move from the 165 degree angular position to the 95 degree angular position, as indicated in the upper row of indicia. Accordingly, the stops 129, 130 in conjunction with the angular indicia 131 permit an operator to accurately and consistently perform the same relative angular movement of the video camera when filming a scene from different vantage points by first setting the stops 129, 130 to the desired angular positions, filming the scene from the first vantage point, resetting the stops 129, 130 to the corresponding angular positions indicated in the lower row of indicia, and then filming the scene from the second vantage point.

Additionally, in the embodiment illustrated in FIGS. 1A-1D, the camera rig assembly 100 also includes a rangefinder 132 (e.g., a telemeter) coupled to the platform 105. In one embodiment, the rangefinder 132 may be used to determine the distance between the camera rig assembly 100 and the scene (e.g., one or more subjects) being filmed by the camera 117 supported on the platform 105. Accordingly, the rangefinder 132 in conjunction with the stops 119, 120 and 129, 130 on the vertical and horizontal tracks 104, 103, respectively, facilitates reproducing the same motion of the camera 117 when, for instance, repeatedly filming the same scene from the same vantage point and/or from different vantage points. In one or more embodiments, the rangefinder 132 may be positioned at any other suitable location on the camera rig assembly 100, such as, for instance, on the base 101 or the carrier 112 of the vertical crank assembly 110.

In the embodiment illustrated in FIGS. 1A-1D, the camera rig assembly 100 also includes a pedometer 133 configured to be worn by an operator of the camera film rig 100. In the illustrated embodiment, the pedometer 133 is tethered by a cable 134 to the base 101. The pedometer 133 is configured to measure the distance that the camera rig assembly 100 moved during the task of filming a scene, which enables reproducibility and consistency when repeatedly filming the scene from the same vantage point and/or from different vantage points. In one or more embodiments, the camera rig assembly 100 may include any other suitable device configured to measure the distance that the camera rig assembly 100 moved during the task of filming a scene, such as, for instance, a GPS device. Accordingly, an operator repeatedly filming a scene from the same vantage point and/or different vantage points may achieve consistency between the shots by using the rangefinder 132 to maintain the same distance between the camera rig assembly 100 and the scene, using the pedometer 133 and/or the GPS device to achieve the same distance travelled by the camera rig assembly 100, using the stops 129, 130 on the horizontal track 103 to achieve the same angular sweep of the camera 117, and using the stops 119, 120 on the vertical track 104 to achieve the same vertical motion of the camera 117 while filming the scene.

Although in the illustrated embodiment the angular/horizontal and vertical positions of the platform 105 are independently positionable (e.g., by cranking the horizontal adjustment crank 126 and the vertical adjustment crank 114, respectively), in one or more embodiments, the angular/horizontal and vertical positions of the platform 105 may be controlled together (e.g., simultaneously). For instance, in one or more embodiments, the pinion gears 113, 125 of the vertical crank assembly 110 and the horizontal crank assembly 122, respectively, may be coupled together such that cranking (arrow 128) the horizontal adjustment crank 126 also adjusts the vertical position of the platform 105 along the vertical track 104.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Although relative terms such as "horizontal," "vertical," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present therebetween.

What is claimed is:

1. A camera rig, comprising:
   a first track;
   a second track movably coupled to the first track, wherein the second track is configured to move along the first track between a first angular position and a second angular position;
   a platform movably coupled to the second track, wherein the platform is configured to support a camera and wherein the platform is configured to move along the second track between a first vertical position and a second vertical position;
   a plurality of radial indicator positions on the first track, each radial indicator position of the plurality of radial indicator positions comprising a pair of associated angular indicia;
   a pair of first stops repositionable along the first track, the pair of first stops being selectively alignable with two different radial indicator positions of the plurality of radial indicator positions to aid in setting an angular sweep of the second track along the first track;
   a base coupled to the first track;
   a harness coupled to the base configured to be worn by an operator;
   a first hand crank coupling the second track to the first track, wherein the first hand crank is configured to be manually operated by the operator to move the second track along the first track between the first angular position and the second angular position; and
   a second hand crank coupling the platform to the second track, wherein the second hand crank is configured to be manually operated by the operator to move the platform along the second track between the first vertical position and the second vertical position.

2. The camera rig of claim 1, wherein the first track is semi-annular.

3. The camera rig of claim 1, wherein each pair of associated angular indicia comprises a pair of complementary or supplementary angles.

4. The camera rig of claim 1, further comprising a pair of second stops positionable along the second track to aid in setting a vertical position of the platform along the second track.

5. The camera rig of claim 1, wherein each of the first track and the second track comprises a plurality of teeth.

6. The camera rig of claim 1, further comprising a dolly coupled to the first track.

7. The camera rig of claim 1, further comprising a rangefinder coupled to the platform.

8. A camera rig, comprising:
   a first track;
   a second track movably coupled to the first track, wherein the second track is configured to move along the first track between a first angular position and a second angular position;
   a platform movably coupled to the second track, wherein the platform is configured to support a camera and wherein the platform is configured to move along the second track between a first vertical position and a second vertical position;
   a support base coupled to the first track; and
   a pedometer coupled to the support base.

\* \* \* \* \*